C. F. ERICKSON.
VEHICLE WHEEL.
APPLICATION FILED MAR. 18, 1915.
1,188,165.
Patented June 20, 1916.
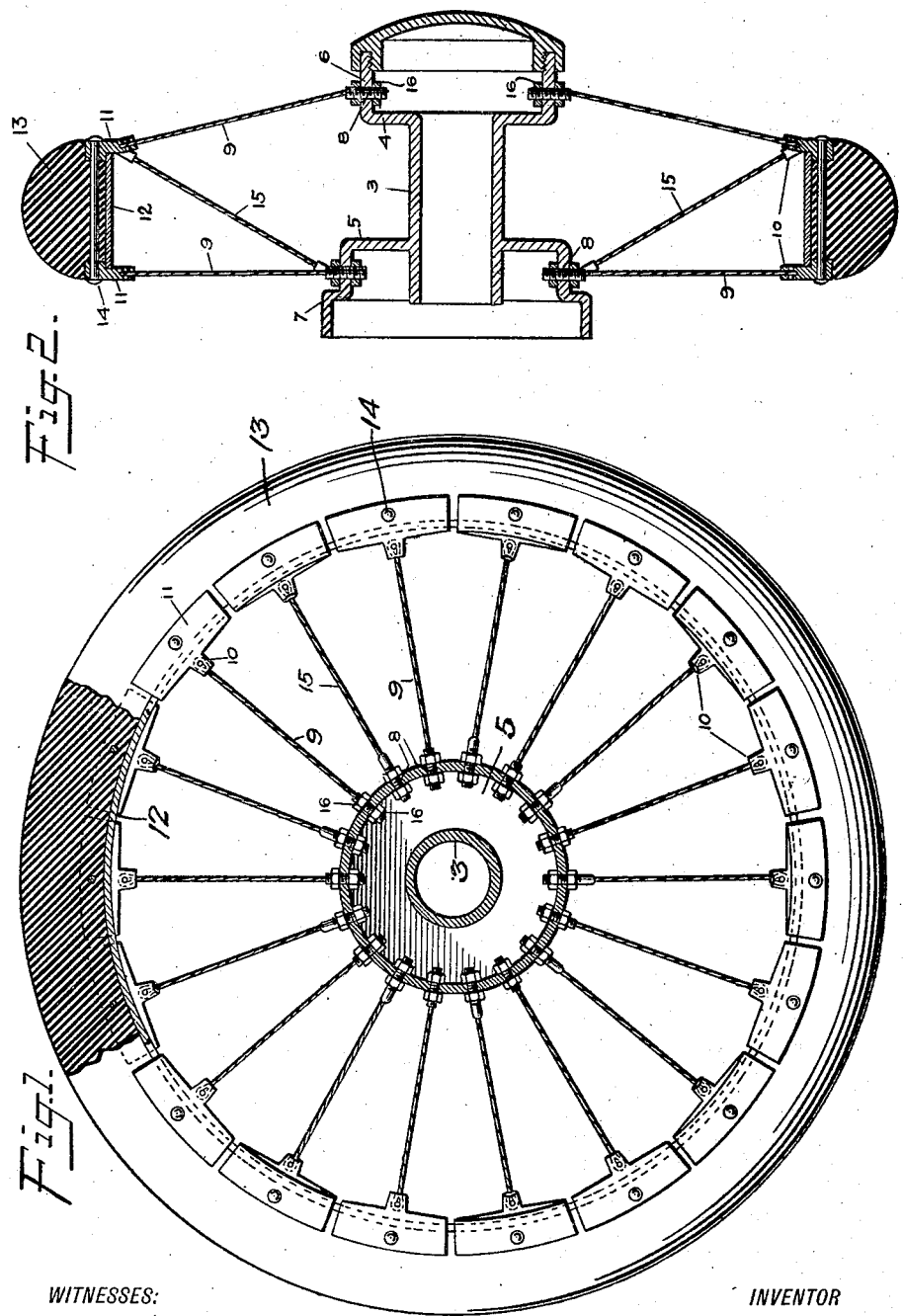
WITNESSES:
INVENTOR
Charles F. Erickson
BY
ATTORNEY

UNITED STATES PATENT OFFICE.

CHARLES F. ERICKSON, OF NEW YORK, N. Y.

VEHICLE-WHEEL.

1,188,165.  Specification of Letters Patent.  Patented June 20, 1916.

Application filed March 18, 1915. Serial No. 15,161.

*To all whom it may concern:*

Be it known that I, CHARLES F. ERICKSON, a subject of the King of Sweden, and a resident of the city of New York, borough of Brooklyn, in the county of Kings and State of New York, have invented a new and Improved Vehicle-Wheel, of which the following is a full, clear, and exact description.

My invention relates to vehicle wheels, and has reference more particularly to the resilient, non-pneumatic class of wheels.

The object of the invention is to provide a simple, strong and inexpensive vehicle wheel which is characterized by a resilient rim connected to the hub by pliable non-resilient spokes.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a wheel embodying my invention partly in section to show the details of construction; and Fig. 2 is a vertical section thereof.

Referring to the drawings, 3 represents the hub provided with laterally disposed flanged portions 4 and 5. The flange 4 has a tubular extension 6 forming a casing for the wheel-securing means. The flange 5 has a tubular extension 7 which constitutes the brake drum. The tubular portions 6 and 7 are each provided with a circularly disposed series of openings 8 adapted to accommodate the threaded ends of pliable, non-resilient spokes 9, which can be made of rope or cable. The so-formed spokes will, therefore, be substantially inelastic, although pliable. The outer ends of the spokes are connected to corresponding sockets 10 in ring sections 11. The ring sections are disposed on each side of a resilient rim 12 and form on each side of the rim a sectional ring. The rim is preferably formed of a flat steel band the resiliency of which maintains the pliable spokes 9 taut.

Located between the ring sections and in engagement with the rim 12 is a rubber shoe 13. The facing ring sections 11 of the two sectional rings are connected by bolts 14 which maintain said ring section in engagement with the rim 12. The said bolts also pass through the rubber shoe 13 so as to lock the same and the rings to the rim. In addition to the side spokes 9 the wheel is provided with diagonally disposed spokes 15 which unite the flange 7 of the hub with the sectional ring located on the other side of the wheel. The nature of the spokes 15 is the same as that of the spokes 9. By means of the nuts 16 provided on the threaded ends of the spokes, the tension thereof can be adjusted. The ring sections 11 forming the rings permit the resilient rim 12 to yield under shocks or change of load and thus relieve the axle from excessive shocks.

While I have described the principle of operation, together with the device which I now consider to be the best embodiment thereof, I desire to have it understood that the device shown is merely illustrative and that such changes may be made as are within the scope of the appended claim.

I claim:

In a vehicle wheel, a hub, a flat steel band forming a rim, a sectional ring on the front and on the rear of the rim, each of said sections engaging the outer periphery of the rim, pliable non-resilient spokes connecting the hub with the sections of the rings, said spokes having means at the hub for securing the spokes to the hub and for varying the tension of the spokes, a shoe engaging the rim and the sections of the rings, and bolts binding the opposite sections of the rings and the shoe together.

In testimony whereof I have signed my name to this specification in the presence of two subscribing witnesses.

CHARLES F. ERICKSON.

Witnesses:
 V. H. JACOBSON,
 Jos. F. Cox.

Copies of this patent may be obtained for five cents each, by addressing the "Commissioner of Patents, Washington, D. C."